(12) United States Patent
Shim

(10) Patent No.: US 11,380,917 B2
(45) Date of Patent: Jul. 5, 2022

(54) SYSTEM AND METHOD FOR INJECTING A DEICING AGENT IN A MUFFLER FOR A FUEL CELL ELECTRIC VEHICLE

(71) Applicants: HYUNDAI MOTOR COMPANY, Seoul (KR); KIA CORPORATION, Seoul (KR)

(72) Inventor: Yun-Jeong Shim, Donghae-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 17/319,829

(22) Filed: May 13, 2021

(65) Prior Publication Data
US 2022/0140368 A1 May 5, 2022

(30) Foreign Application Priority Data
Nov. 2, 2020 (KR) .................. 10-2020-0144237

(51) Int. Cl.
*H01M 8/04223* (2016.01)

(52) U.S. Cl.
CPC ... *H01M 8/04253* (2013.01); *H01M 8/04268* (2013.01); *H01M 2250/20* (2013.01)

(58) Field of Classification Search
CPC ......... H01M 8/04253; H01M 8/04268; H01M 2250/20
See application file for complete search history.

(56) References Cited

U.S. PATENT DOCUMENTS

2019/0305342 A1* 10/2019 Grosch ............. H01M 8/04164

FOREIGN PATENT DOCUMENTS

| KR | 20030017249 A | 3/2003 |
| KR | 102056634 B1 | 12/2019 |

* cited by examiner

*Primary Examiner* — Stewart A Fraser
(74) *Attorney, Agent, or Firm* — Lempia Summerfield Katz LLC

(57) ABSTRACT

A fuel cell electric vehicle includes a muffler deicing agent injection system composed of a deicing agent injector injecting a deicing agent, which is pumped by a deicing agent injection pump, from a deicing agent tank and is supplied to a deicing agent pipe. The muffler deicing agent injection system performs a muffler deicing agent injection logic to inject the deicing agent through operations of the deicing agent injection pump and the deicing agent injector by a controller under an ambient temperature satisfaction condition and a deicing agent injection satisfaction condition.

17 Claims, 8 Drawing Sheets

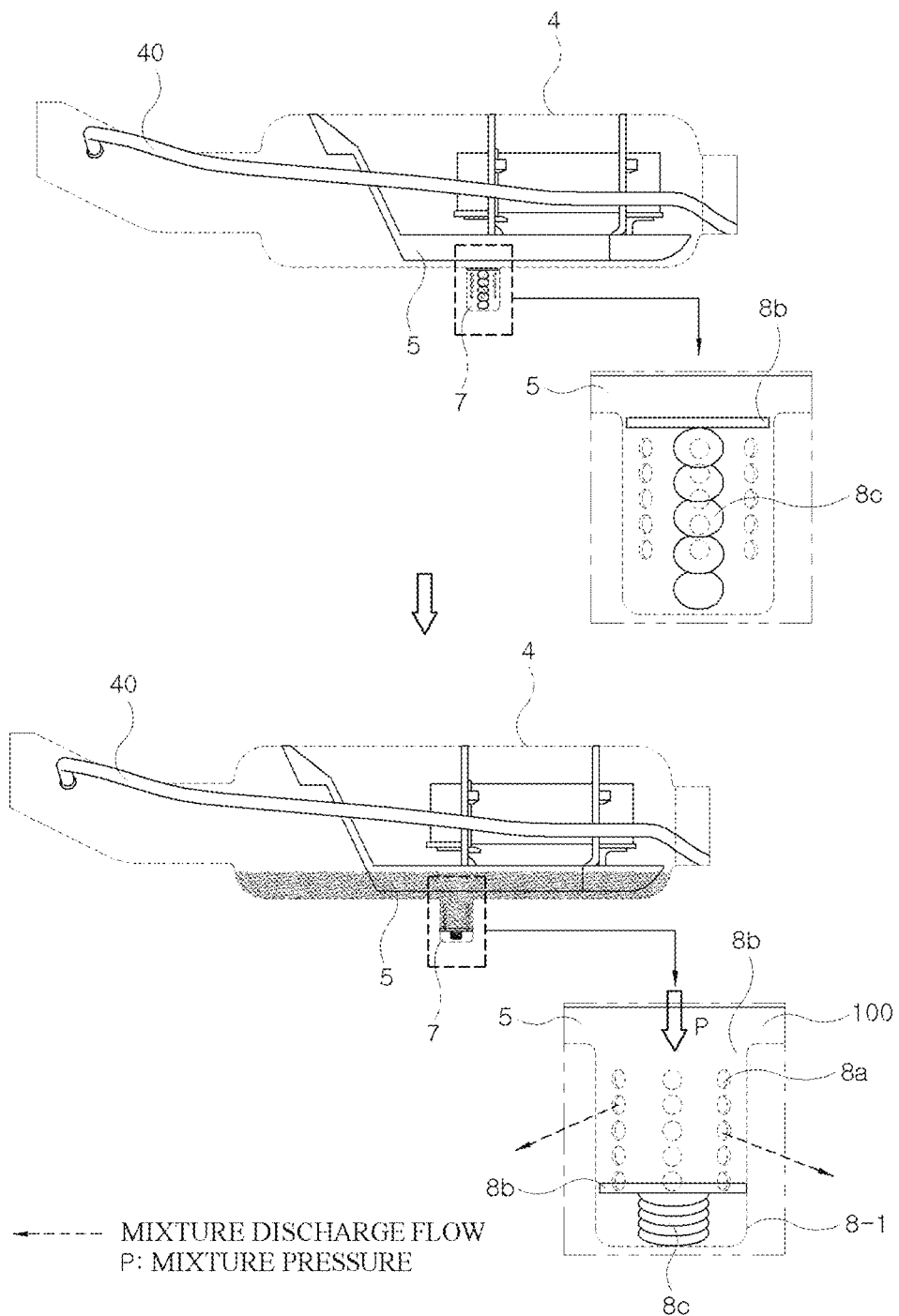

SYSTEM AND METHOD FOR INJECTING A DEICING AGENT IN A MUFFLER FOR A FUEL CELL ELECTRIC VEHICLE

CROSS-REFERENCE(S) TO RELATED APPLICATIONS

This application claims priority to Korean Patent Application No. 10-2020-0144237, filed on Nov. 2, 2020, which is incorporated herein by reference in its entirety.

BACKGROUND

Field of the Disclosure

Embodiments of the present disclosure relate to a fuel cell for an electric vehicle, and particularly, to a method for injecting a deicing agent in a muffler for a fuel cell electric vehicle, which does not require a load increase of a fuel cell even at a low ambient temperature by injecting a deicing agent in a system for injecting a deicing agent in the muffler and mixing the injected deicing agent with water in the muffler.

Description of the Related Art

In general, a fuel cell electric vehicle produces electricity by reacting hydrogen and oxygen and generates hydrogen ($H_2$) and water vapor as by-products in the electricity production process.

As an example, in the fuel cell electric vehicle, non-reacted hydrogen ($H_2$) and water vapor pass through a muffler of an exhaust system. In this process, the hydrogen ($H_2$) comes out from the muffler and is discharged in the air, whereas the water vapor is aggregated into water in the muffler. The water then comes out from the muffler, is discharged to a lower end of the vehicle, and sprinkled on the road.

However, the fuel cell electric vehicle has the drawback in that it is required to maintain the water produced in the muffler not to freeze in winter or on special geographic conditions in countries where the temperature is always low (e.g., northern hemisphere or southern hemisphere) as compared with an ambient temperature at which water does not freeze.

As an example, the fuel cell electric vehicle should increase the heating rate of a fuel cell (stack) on conditions in which the water may possibly freeze, and thus should suffer a reduction in fuel economy in accordance with the load increase of the fuel cell.

If the load of the fuel cell is reduced in order to prevent the fuel economy of the fuel cell electric vehicle from being reduced, the water production amount is increased due to condensation of the water vapor in the muffler at an ambient temperature below the freezing point to cause the amount of water being discharged to the road to be increased. Thus, thin ice may be formed on the road or an icy road may be formed in severe cases.

Accordingly, the fuel cell electric vehicle has no choice but to operate to increase the load of the fuel cell while sacrificing fuel economy reduction at an ambient temperature below the freezing point so as not to induce the safety problem behind vehicles caused by a black ice phenomenon occurring due to the thin ice on the road or the icy road.

SUMMARY

Embodiments of the present disclosure overcome the above disadvantages and other disadvantages not described above and provide a system and a method for injecting a deicing agent in a muffler for a fuel cell electric vehicle. The disclosed system and method prevent the occurrence of a black ice phenomenon on a road by injecting a deicing agent into a muffler of a fuel cell electric vehicle, mixing water produced by water vapor condensation in the muffler with the deicing agent, and discharging the water mixed with the deicing agent from the muffler. The disclosed system and method can optimize a use amount of the deicing agent by adjusting an injection amount of the deicing agent in the muffler in consideration of an ambient temperature and a hydrogen consumption amount.

Other objects and advantages of the present disclosure can be understood by the following description and should become apparent with reference to the embodiments of the present disclosure. Also, it should be apparent to those having ordinary skill in the art to which the present disclosure pertains that the objects and advantages of the present disclosure can be realized by the means as claimed and combinations thereof.

In accordance with the present disclosure and to achieve the above object, a system for injecting a deicing agent in a muffler includes: a deicing agent tank storing the deicing agent therein; a deicing agent injection pump sending out the deicing agent from the deicing agent tank to a deicing agent pipe by pumping the deicing agent; and a deicing agent injector provided in the deicing agent pipe and injecting the deicing agent into an exhaust pipe of an exhaust system.

As an embodiment, hydrogen ($H_2$) and water vapor are produced by a chemical reaction of hydrogen and oxygen and flow in the exhaust pipe as an exhaust gas.

As an embodiment, the deicing agent is a liquid deicing agent.

As an embodiment, the deicing agent injection pump is combined with the deicing agent tank.

As an embodiment, the deicing agent injector is directly installed in the exhaust pipe of the exhaust system. In another embodiment the deicing agent injector is directly installed in the muffler of the exhaust system.

As an embodiment, the deicing agent injection pump and the deicing agent injector are respectively controlled by a controller, and the controller injects the deicing agent under an ambient temperature condition.

As an embodiment, the ambient temperature condition is classified into a freezing point temperature and a temperature below the freezing point temperature. An injection amount of the deicing agent is increased at the temperature below the freezing point temperature rather than at the freezing point temperature.

As an embodiment, the injection amount of the deicing agent is determined by a deicing agent map. The deicing agent map determines the injection amount of the deicing agent in accordance with an ambient temperature and a water production amount.

As an embodiment, the water production amount is calculated and determined through the ambient temperature and a hydrogen consumption amount.

As an embodiment, the deicing agent map constructs a list of the injection amount of the deicing agent at the freezing point temperature and the injection amount of the deicing agent at the temperature below the freezing point temperature. The list reflects the water production amount predicted by a chemical reaction or a hydrogen consumption amount necessary for the chemical reaction.

As an embodiment, the controller injects the deicing agent by identifying the ambient temperature condition through the ambient temperature detected by a temperature sensor and identifying a deicing agent storage amount of the deicing agent tank through a flow sensor.

As an embodiment, the controller warns of a lack of the deicing agent storage amount through a warning light.

As an embodiment, the exhaust system is provided with the muffler and a water collection structure, formed in the muffler, collects water caused by the water vapor of the exhaust gas flowing into the muffler and the deicing agent and produces a water mixture.

As an embodiment, the water collection structure collects the water caused by condensation of the water vapor and the deicing agent and produces the water mixture in an inner space into which the exhaust gas flows.

As an embodiment, the water collection structure is composed of a water collection plate and an etching filter provided on the water collection plate, filtering the water vapor and the deicing agent.

As an embodiment, the water collection plate is spaced apart from a bottom side of the inner space at a predetermined interval in a front part position of the inner space.

As an embodiment, the muffler is connected to the water collection structure through a stopper type discharge cup which communicates with the water collection structure and discharges the water mixture out of the muffler when a water pressure of the water mixture is higher than an elastic force of an elastic body connected to a stopper In another embodiment, the muffler is connected to the water collection structure through a buoyancy type discharge cup which communicates with the water collection structure by buoyancy of the water mixture and discharges the water mixture out of the muffler.

As an embodiment, the muffler communicates with a sprayer connected to the water collection structure. The sprayer discharges the water mixture from the muffler to an outside in various directions.

Further, in accordance with the present disclosure and to achieve the above object, a fuel cell electric vehicle includes an exhaust pipe through which hydrogen ($H_2$) and water vapor generated as by-products of a chemical reaction of hydrogen and oxygen to produce electricity flow as an exhaust gas. The vehicle also includes a muffler deicing agent injection system composed of a deicing agent injector injecting a deicing agent, coming out from a deicing agent tank through pumping of a deicing agent injection pump and being supplied to a deicing agent pipe, into the exhaust pipe. The vehicle also includes a muffler forming an inner space into which the exhaust gas flows from the exhaust pipe and including a water collection structure provided at a front part of the inner space and producing a water mixture through collection of water caused by condensation of the water vapor and the deicing agent. The vehicle also includes a water discharge device composed of any one of a stopper type discharge cup discharging the water mixture out of the muffler by a water pressure of the water mixture and a buoyancy type discharge cup discharging the water mixture out of the muffler by buoyancy of the water mixture and connected to the water collection structure.

As an embodiment, the muffler deicing agent injection system is mounted on a bottom panel on which the exhaust pipe is arranged.

Further, in accordance with the present disclosure and to achieve the above object, a method for injecting a deicing agent in a muffler includes an ambient temperature determining step of identifying an ambient temperature condition that requires deicing agent injection by a controller. The method also includes a deicing agent injection preparing step of identifying an injectable deicing agent injection amount as a deicing agent injection condition. The method also includes a deicing agent injecting step of injecting the deicing agent. The deicing agent comes out from a deicing agent tank through pumping of a deicing agent injection pump and is supplied to a deicing agent pipe in the deicing agent injection amount through a deicing agent injector. The deicing agent injection step also includes making the deicing agent flow into the muffler through an inside of an exhaust pipe in which hydrogen ($H_2$) and water vapor produced by a chemical reaction of the hydrogen and oxygen flow as an exhaust gas.

As an embodiment, as the ambient temperature condition, an ambient temperature detection value of the temperature sensor is classified into a freezing point temperature and a temperature below the freezing point temperature. The deicing agent injection is performed at the freezing point temperature and at the temperature below the freezing point temperature, respectively. In the deicing agent injection, an injection amount of the deicing agent at the temperature below the freezing point temperature is set to be larger than an injection amount of the deicing agent at the freezing point temperature.

As an embodiment, the freezing point temperature is set in a state where the ambient temperature detection value is 5° C. to 0° C. The temperature below the freezing point temperature is set in a state where the ambient temperature detection value is 0° C. to −10° C.

As an embodiment, the deicing agent injection amount is identified by a deicing agent map based on a water production amount, which constructs a list of the deicing agent injection amount at the freezing point temperature and the deicing agent injection amount at the temperature below the freezing point temperature based on a predicted water production amount by the chemical reaction. In another embodiment, the deicing agent injection amount is identified by a deicing agent map based on a hydrogen consumption amount, which constructs a list of the deicing agent injection amount at the freezing point temperature and the deicing agent injection amount at the temperature below the freezing point temperature based on the hydrogen consumption amount necessary for the chemical reaction.

As an embodiment, the deicing agent injection condition is a deicing agent storage amount of the deicing agent tank, which is identified by a flow sensor. If the deicing agent storage amount lacking as the deicing agent injection amount, such a lack of deicing agent is warned by a warning light.

As described above, the deicing agent injection using the muffler deicing agent injection system mounted on the fuel cell electric vehicle according to the present disclosure implements the following works and effects.

First, since freezing in the muffler is prevented through injection of the liquid deicing agent into the muffler, it is possible to prevent the occurrence of non-startup of the fuel cell electric vehicle caused by the freezing in the muffler in winter. Second, since the road freezing phenomenon is prevented from occurring through sprinkling of the water mixed with the deicing agent from the fuel cell electric vehicle onto the road, vehicle accidents caused by the fuel cell electric vehicle in winter can be prevented. Third, since internal water freezing is prevented through mixing of the deicing agent in the muffler, it is possible to prevent the deterioration of the fuel cell stack efficiency caused by the temperature increase of the stack to prevent the freezing in the existing exhaust system. Thus, the fuel economy is improved through an efficient use of the fuel cell stack regardless of the ambient temperature. Fourth, since the water mixed with the deicing agent is sprinkled on the road may even melt the ice produced caused by the snow melting, road maintenance effects occur in winter. Fifth, by converting the deicing agent injection structure into the calcium chloride injection structure, the fuel cell electric vehicle can have scalability such that that it also performs a role of a snow removal vehicle. Sixth, since the fuel cell electric vehicle combined with the snow removal vehicle can perform official duties and road maintenance together as the snow removal vehicle (calcium chloride injection vehicle), the utilization of the fuel cell electric vehicle can be extended to a national public vehicle.

It is to be understood that both the foregoing general description and the following detailed description of the present disclosure are explanatory and are intended to provide further explanation of the disclosure as claimed.

BRIEF DESCRIPTION OF THE DRAWINGS

The above and other objects, features, and other advantages of the present disclosure should be more clearly understood from the following detailed description taken in conjunction with the accompanying drawings, in which:

FIG. 8 is a diagram illustrating a state in which a mixture of water and a deicing agent in a muffler is automatically discharged by its weight through opening of a water discharge device from the muffler of a fuel cell electric vehicle according to the present disclosure.

DESCRIPTION OF SPECIFIC EMBODIMENTS

Hereinafter, embodiments of the present disclosure are described in detail with reference to the accompanying drawings and those having ordinary skill in the art to which the present disclosure pertains should be able to implement the embodiments in various different forms. Accordingly, the present disclosure is not limited to the embodiments as described herein.

Figure 1:
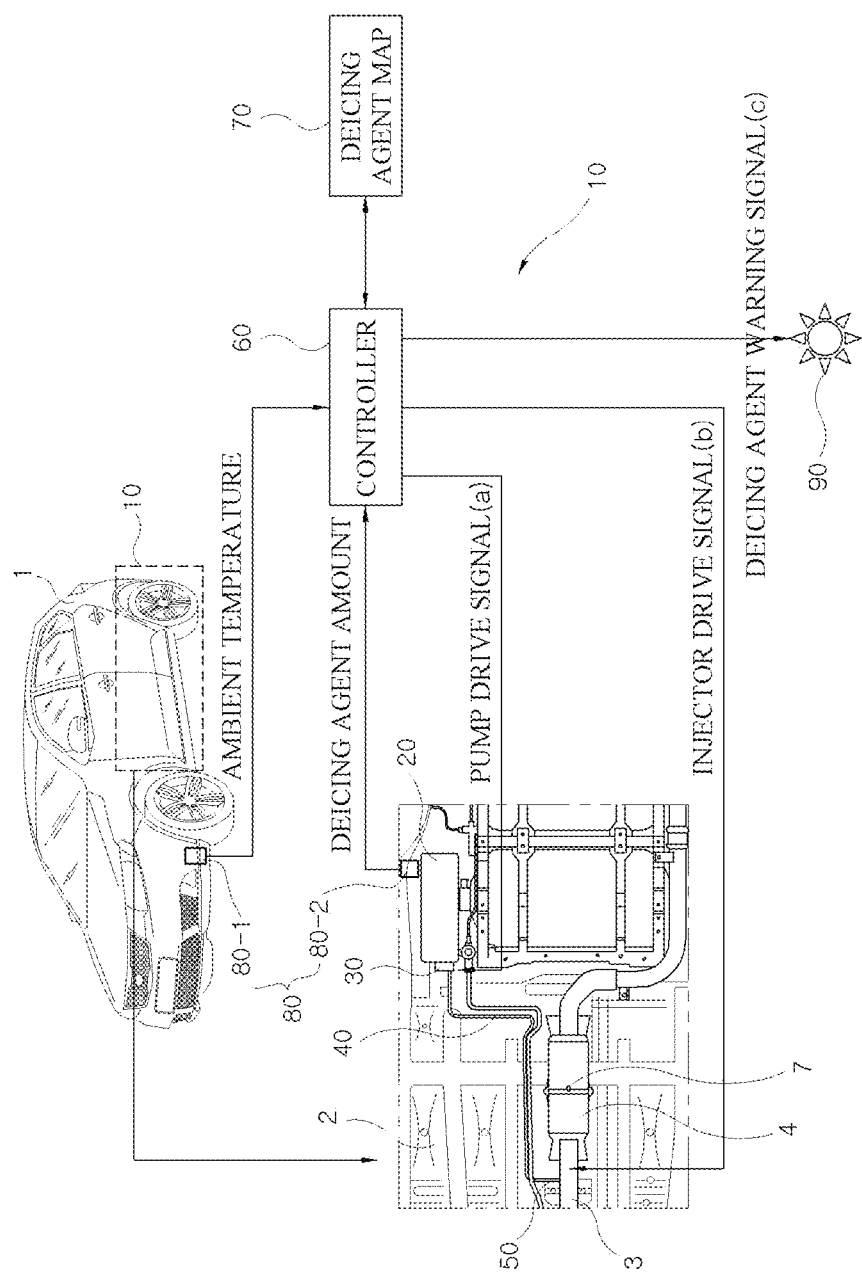
FIG. 1 is a diagram illustrating the configuration of a fuel cell electric vehicle mounted with a system for injecting a deicing agent in a muffler according to the present disclosure.

Referring to FIG. 1, a fuel cell electric vehicle 1 includes a system 10 for injecting a deicing agent in a muffler, which does not require a separate heating system through the use of a deicing agent (e.g., liquid deicing agent) that does not freeze at 50 degrees below zero (−50° C.) and/or below.

In particular, the system 10 for injecting a deicing agent in a muffler calculates a water production amount that requires a deicing agent injection through a deicing agent map 70 and injects the deicing agent into an inner space 4-1 of the muffler 4 based on an ambient temperature detected by a temperature sensor 80-1. The deicing agent injection is thus stably performed without a freezing phenomenon even in a low ambient temperature situation. In this case, in injecting the deicing agent, the injection amount of the deicing agent is adjusted based on a deicing agent storage amount of a deicing agent tank 20 detected by a flow sensor 80-2.

Accordingly, the fuel cell electric vehicle 1 may have the advantage that a poor startup problem due to freezing can be solved by deicing agent injection that is not affected by an outside weather environment, such as a cold weather situation. The fuel cell electric vehicle 1 may also have the advantage that the deicing agent injection amount can be controlled in accordance with not only external environments but also in accordance with the driving situation of the fuel cell electric vehicle and corresponding different water production amounts.

Specifically, the system 10 for injecting the deicing agent in the muffler is composed of a deicing agent tank 20; a deicing agent injection pump 30; a deicing agent pipe 40; and a deicing agent injector 50 as deicing agent injection constituent elements. The system 10 is mounted on a bottom panel 2 and is connected to an exhaust pipe 3. As an example, the deicing agent tank 20 is a reservoir for storing the deicing agent, and the deicing agent is a liquid deicing agent having the characteristic in that it does not freeze at 50 degrees below zero (−50° C.) and/or below. The deicing agent injection pump 30 is driven under the control of a controller 60 to send out the deicing agent pumped from the deicing agent tank 20 to the deicing agent pipe 40. The deicing agent injection pump 30 has an inlet part connected to the deicing agent tank 20 and an outlet part connected to the deicing agent pipe 40. In an embodiment, a flow pump is applied as the deicing agent injection pump 30.

As an example, the deicing agent pipe 40 has one side connected to the deicing agent injection pump 30 and the other side provided with the deicing agent injector 50. In particular, the deicing agent pipe 40 is made of a material that does not chemically react on the deicing agent, and has a multistage bending structure forming a plurality of bending regions in consideration of the shape of the bottom panel 2 and the arrangement of the exhaust pipe 3.

As an example, the deicing agent injector 50 is provided at an end of the deicing agent pipe 40, is combined with the exhaust pipe 3, and is driven under the control of the controller 60 to inject the deicing agent into the exhaust pipe 3. In particular, the deicing agent injector 50 may be mounted on the exhaust pipe 3 at the front end of the muffler 4 so that the injected deicing agent enters into the muffler 4 through the exhaust pipe 3. Alternatively, the deicing agent injector 50 may be directly mounted on the muffler 4 to directly inject the deicing agent to the muffler 4 if necessary.

Further, the system 10 for injecting the deicing agent in the muffler is composed of the controller 60, a deicing agent map 70, a sensor 80, and a warning light 90 as deicing agent injection control elements. The system 10 injects the deicing agent into the exhaust pipe 3 in front of the muffler 4.

As an example, the controller 60 receives a command (e.g., engine electronic control (ECU) signal) of the fuel cell electric vehicle 1 as a controller area network (CAN) signal and sends a drive command to the deicing agent injection pump 30 and the deicing agent injector 50.

In particular, the controller 60 predicts a fuel cell consumption amount in the fuel cell electric vehicle 1 and the total water production amount (e.g., water production amount+water vapor condensation amount) in accordance with an ambient temperature. The controller 60 determines whether to inject the deicing agent, determines the deicing agent injection amount, and adjusts the deicing agent injection amount.

For this, the controller 60 is provided with the deicing agent map 70 and operates as a central processing unit that performs data detection, computation, and calculation for the control in association with a memory storing a logic of muffler deicing agent injection control (refer to FIG. 6) through programming.

Further, the controller 60 is associated with the sensor 80 and the warning light 90.

As an example, the sensor 80 is classified into a temperature sensor 80-1 installed in the fuel cell electric vehicle 1 and a flow sensor 80-2 installed in the deicing agent tank 20 and/or the deicing agent injection pump 30. In this case, the temperature sensor 80-1 detects the ambient temperature in an external environment in which the fuel cell electric vehicle 1 resides and transmits the detected temperature to the controller 60. The flow sensor 80-2 detects a deicing agent level of the deicing agent tank 20 or a discharge amount of the deicing agent injection pump 30 and transmits a detection value of the deicing agent storage amount of the deicing agent tank 20 to the controller 60.

As an example, the warning light 90 is installed on a driver's seat cluster of the fuel cell electric vehicle 1 and is turned on by a deicing agent lacking signal of the controller 60 to warn of the lack of the deicing agent to a driver for deicing agent supplement.

Figure 2:
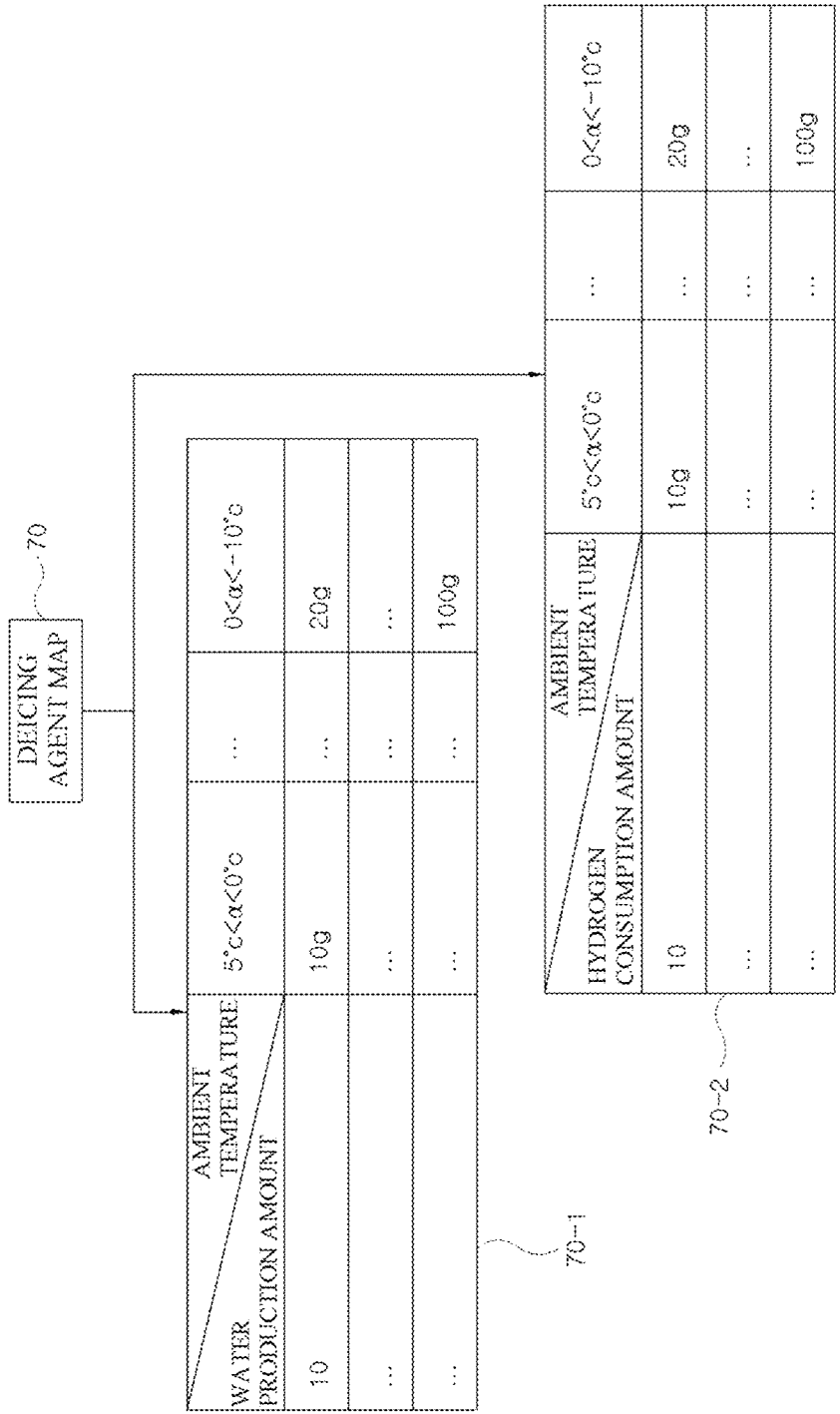
FIG. 2 is a diagram illustrating an example of a deicing agent map being classified into a map based on a hydrogen consumption amount and a map based on a water production amount according to the present disclosure.

Referring to FIG. 2, the deicing agent map 70 is classified into a deicing agent map 70-1 based on a water production amount and a deicing agent map 70-2 based on a hydrogen consumption amount.

The following fuel cell electric vehicle chemical reaction scheme represents an example for calculating a water production amount.

[Fuel Cell Electric Vehicle Chemical Reaction Scheme]

| | |
|---|---|
| Anode | $H_2 \rightarrow 2H^+ + 2e^-$ |
| Cathode | $\tfrac{1}{2}O_2 + 2H^+ + 2e^- \rightarrow H_2O$ |
| Total | $H_2 + \tfrac{1}{2}O_2 \rightarrow H_2O$ |
| Example | 2 g of hydrogen + 16 g of oxygen $\rightarrow$ 18 g of water |
| | 1 kg of hydrogen $\rightarrow$ 9 kg of water production |

As described above, the water production amount can be predicted through the fuel cell electric vehicle chemical reaction. In this case, since the water production amount or a hydrogen consumption amount differs in accordance with the performance specification of the fuel cell electric vehicle 1, it should be understood that the above-described example value of the water production amount may vary.

Accordingly, the deicing agent map 70-1 based on the water production amount constructs a deicing agent injection amount list of the deicing agent injection amount at the freezing point temperature and the deicing agent injection amount at the temperature below the freezing point temperature based on the predicted water production amount by the fuel cell electric vehicle chemical reaction. The deicing agent map 70-2 based on the hydrogen consumption amount constructs a deicing agent injection amount list of the deicing agent injection amount at the freezing point temperature and the deicing agent injection amount at the temperature below the freezing point temperature based on the hydrogen consumption amount necessary for the fuel cell electric vehicle chemical reaction.

As an example, the deicing agent map 70-1 based on the water production amount lists a matching value of the ambient temperature and the water production amount as a deicing agent required amount by reflecting that a larger amount of the deicing agent is required at a relatively low temperature with respect to an equal water production amount. In other words, based on 10 (in the unit of gram or liter) of the water production amount in the fuel cell electric vehicle 1, 10 g of the deicing agent is equally required at the ambient temperature corresponding to the freezing point temperature in the range of 5° C.$<\alpha<$0° C., whereas 20 g of the deicing agent is required at the ambient temperature corresponding to the temperature below the freezing point temperature in the range of 0° C.$<\alpha<$−10° C.

Accordingly, the controller 60 reads or identifies the matching value of the ambient temperature and the water production amount of the deicing agent map 70-1 based on the ambient temperature through the ambient temperature detection value of the temperature sensor 80-1. Using the deicing agent required amount value identified therefrom, the controller 60 determines the deicing agent required amount of the fuel cell electric vehicle 1 in accordance with the ambient temperature.

As an example, the deicing agent map 70-2 based on the hydrogen consumption amount lists a matching value of the ambient temperature and the hydrogen consumption amount as a deicing agent required amount by reflecting that a larger amount of the deicing agent is required at a relatively low temperature with respect to an equal hydrogen consumption amount. In other words, based on 10 (in the unit of gram or liter) of the hydrogen consumption amount in the fuel cell electric vehicle 1, 10 g of the deicing agent is equally required at the ambient temperature corresponding to the freezing point temperature in the range of 5° C.$<\alpha<$0° C., whereas 20 g of the deicing agent is required at the ambient temperature corresponding to the temperature below the freezing point temperature in the range of 0° C.$<\alpha<$−10° C.

Accordingly, the controller 60 reads or identifies the matching value of the ambient temperature and the hydrogen consumption amount of the deicing agent map 70-2 based on the hydrogen consumption amount through the ambient temperature detection value of the temperature sensor 80-1, and using the deicing agent required amount value identified therefrom, the controller 60 determines the deicing agent required amount of the fuel cell electric vehicle 1 in accordance with the ambient temperature.

Figure 3:
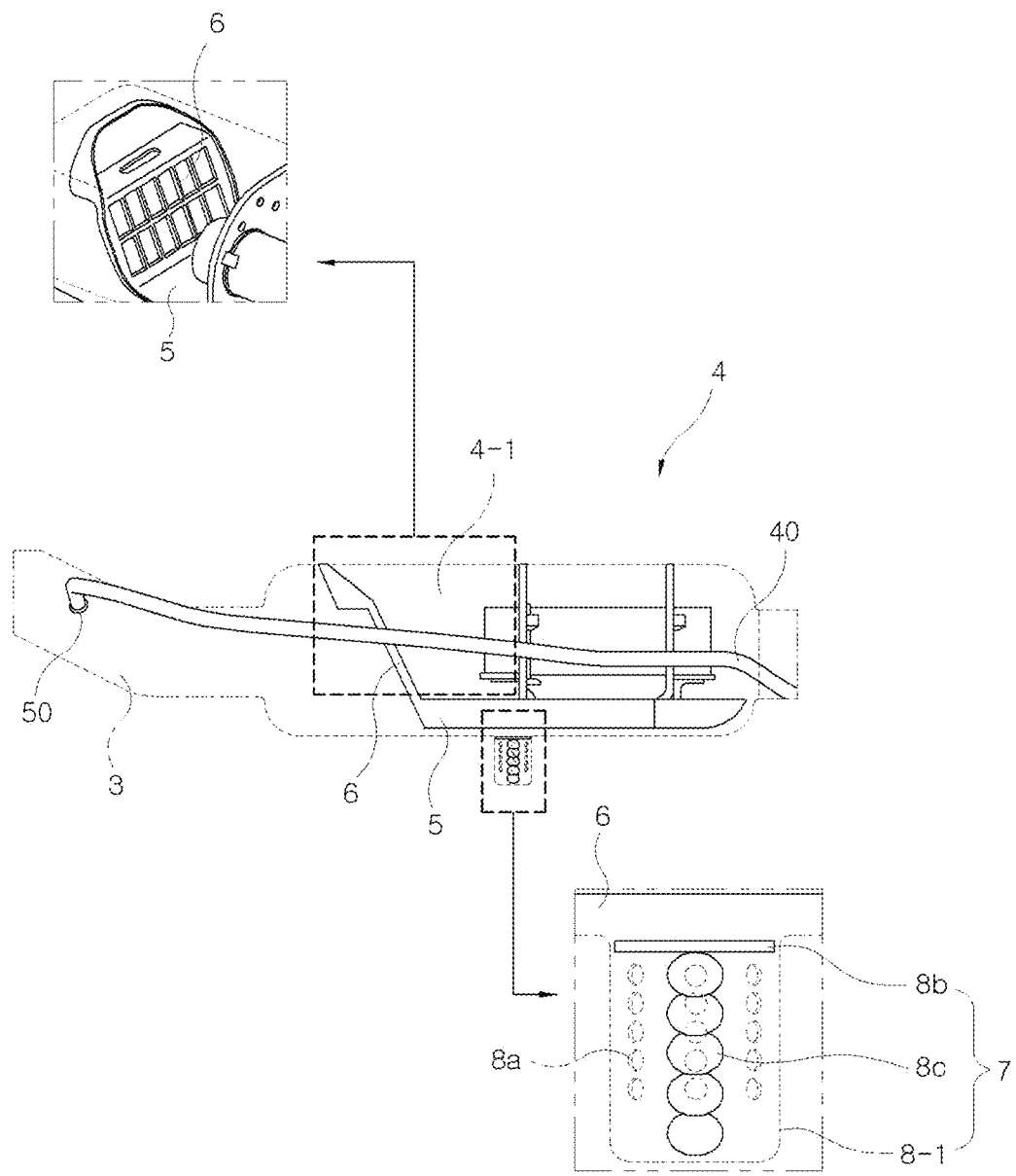
FIG. 3 is a diagram illustrating the configuration of a muffler and a water discharge device according to the present disclosure.
Figure 4:
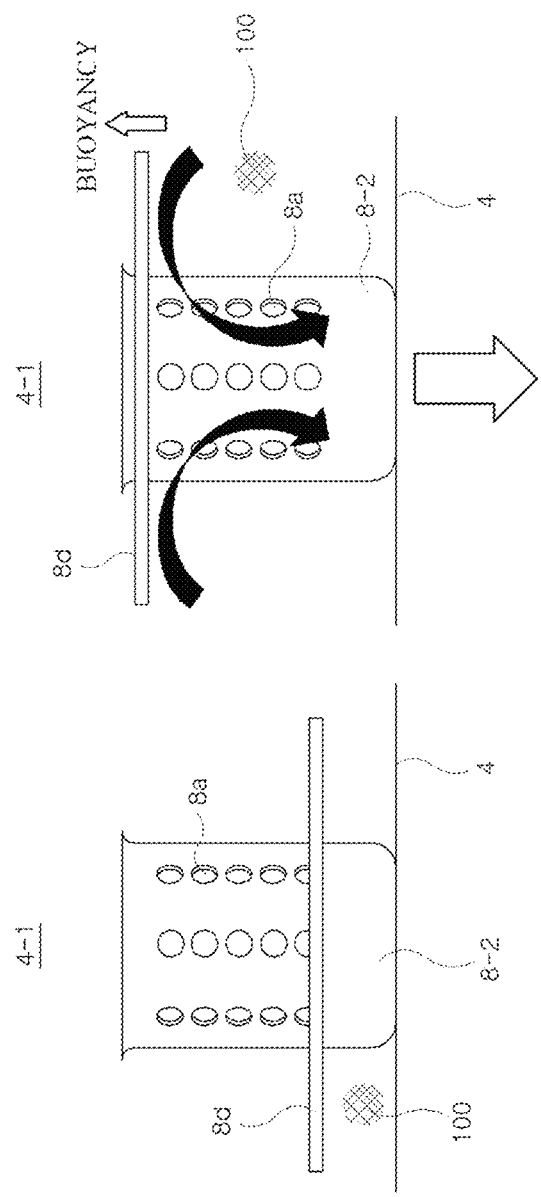
FIG. 4 is a diagram illustrating an example of a water discharge device composed of a buoyancy type discharge cup instead of a stopper type discharge cup according to the present disclosure.
Figure 5:
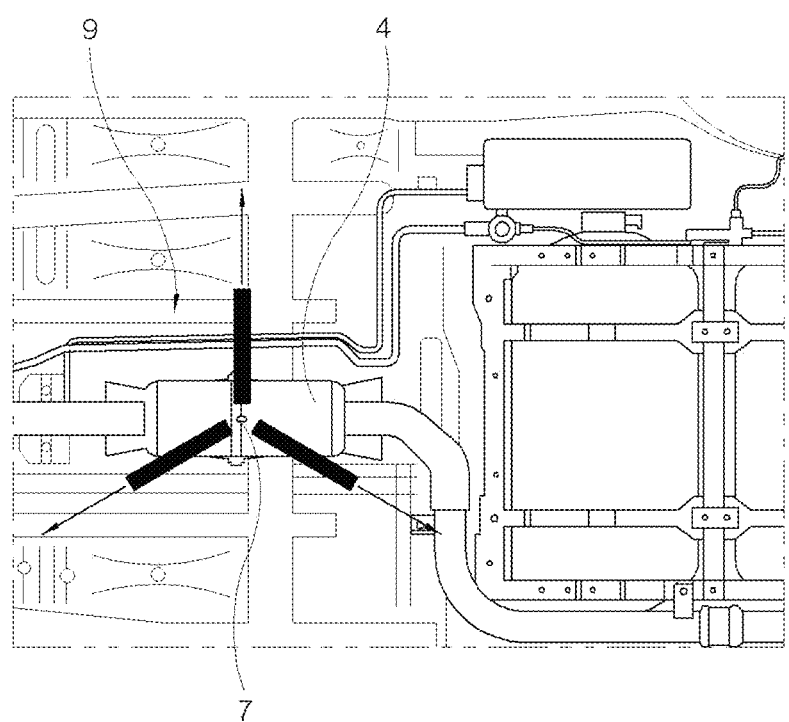
FIG. 5 is a diagram illustrating an example in which a water discharge device is combined with a sprayer according to the present disclosure.

Meanwhile, FIGS. 3-5 show the structure of a muffler 4. Referring to FIG. 3, the muffler 4 is combined with the exhaust pipe 3 and has a typical structure in which the muffler 4 makes the exhaust gas flow from the exhaust pipe 3 and then resends the exhaust gas to the exhaust pipe 3 and lowers the noise and pressure by reducing energy of the exhaust gas in the inner space 4-1.

However, different from the typical one, the muffler 4 forms a water collection structure in the inner space 4-1, and further includes a water discharge device 7 communicating with the water collection structure and exposed to an outside.

As an example, the water collection structure is composed of a water collection plate 5 and an etching filter 6 and is located in a front section of the inner space 4-1 (i.e., front space part into which the exhaust gas flows) in the inner space 4-1 of the muffler 4.

For this, the water collection plate 5 has a one-side swash plate structure and is located in the inner space 4-1. In this case, the one-side swash plate structure forms an acute angle.

Further, the etching filter 6 is combined with the swash plate of the water collection plate 5 and filters the water, water vapor, and deicing agent from the exhaust gas to make them stay in the water collection space.

Accordingly, the water collection structure forms a space in which the water produced through condensation of the water vapor flowing from the inner space 4-1 of the muffler 4 together with the exhaust gas and the deicing agent are mixed and a water mixture 100 (i.e., water+deicing agent) (refer to FIG. 4) is stored.

As an example, the water discharge device 7 is composed of a stopper type discharge cup 8-1, a stopper 8b, and an elastic body 8c. In this case, discharge holes 8a are formed in plural perforated hole columns on the stopper type discharge cup 8-1. Thus, the stopper type discharge cup 8-1 forms a path through which the water mixture 100 comes in and gets out. The stopper 8b is located at an upper end of the stopper type discharge cup 8-1, and the weight of the water mixture 100 collected in the water collection structure directly acts on the stopper 8b. The elastic body 8c is compressed to make the stopper 8b be located at the upper end of the stopper type discharge cup 8-1 using spring elasticity and to make the stopper 8b move downward so that the water mixture 100 is discharged through the discharge holes 8a of the stopper type discharge cup 8-1 when the weight of the water mixture 100 is increased.

In particular, a coil spring is applied as the elastic body 8c.

Accordingly, through the use of the stopper type discharge cup 8-1, the water discharge device 7 is composed of the stopper 8b at the upper end thereof and the elastic body 8c at a lower end thereof. If the water is collected in the water collection structure of the muffler 4, the stopper 8b moves downward through shrinkage of the elastic body 8c by the weight of the water, and the water mixture 100 of the water and the deicing agent is discharged through the discharge holes 8a.

In contrast, referring to FIG. 4, the water discharge device 7 can adjust the water discharge using buoyancy of the water by applying a buoyancy type discharge cup 8-2 to discharge the water mixture 100. This is shown as a water collection state of FIG. 4 (left-side drawing of FIG. 4) and a water discharge state (right-side drawing of FIG. 4).

For this, the water discharge device 7 is composed of the buoyancy type discharge cup 8-2 and a buoyancy body 8d and is located inside the water collection structure in the inner space 4-1 of the muffler 4. In this case, the discharge holes 8a are formed in plural perforated hole columns on the buoyancy type discharge cup 8-2. Thus, the buoyancy type discharge cup 8-2 forms a path through which the water mixture 100 comes in and gets out. The buoyancy body 8d is combined with the buoyancy type discharge cup 8-2 and acts to discharge the water mixture 100 of the water and the deicing agent out of the muffler 4 through the discharge holes 8a of the buoyancy type discharge cup 8-2 by ascending upward through reception of the water buoyancy as the amount of water collected in the water collection structure is increased.

Referring to FIG. 5, the muffler 4 is combined with a sprayer 9 and can adjust the discharge direction of the water mixture 100 variously when the water mixture 100 is discharged out of the muffler 4.

Figure 6:
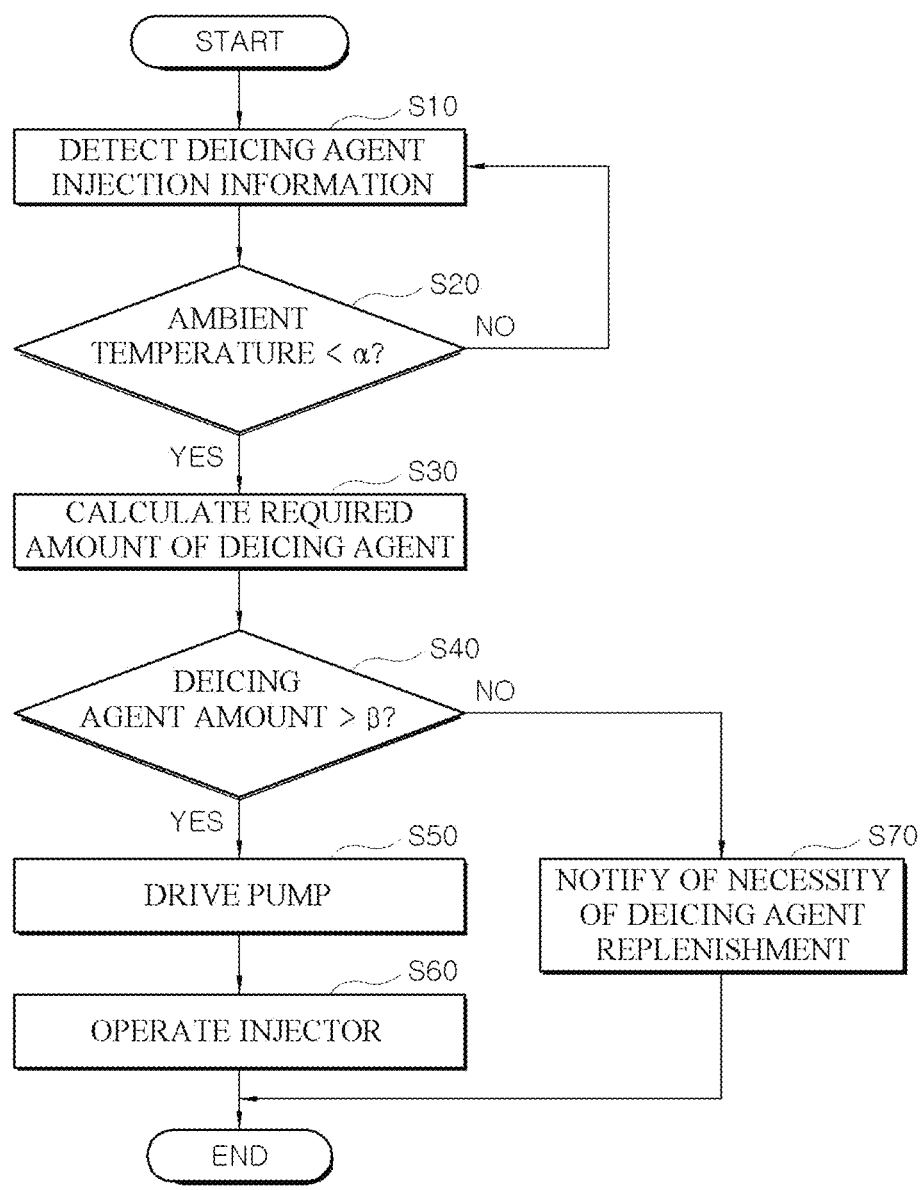
FIG. 6 is a flowchart illustrating a method for injecting a deicing agent in a muffler for a fuel cell electric vehicle using a system for injecting a deicing agent in a muffler according to the present disclosure.
Figure 7:
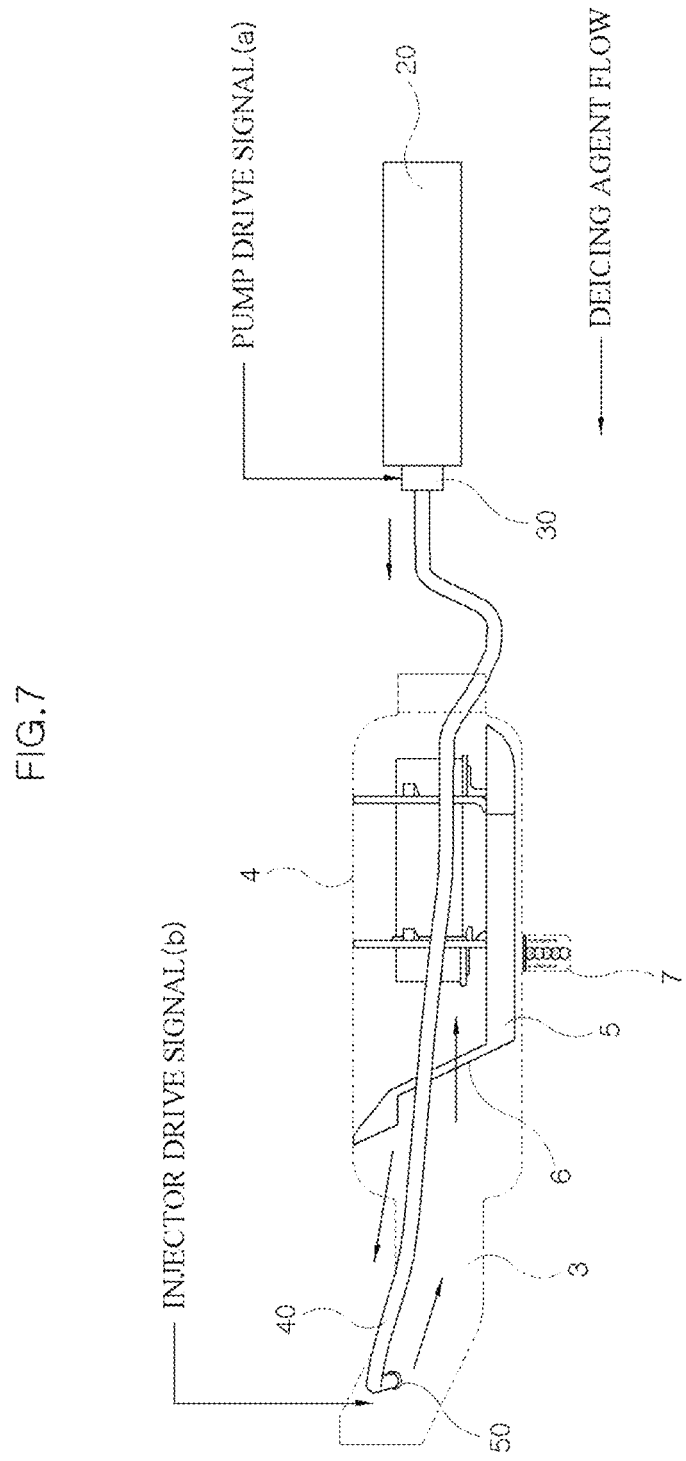
FIG. 7 is a diagram illustrating an operation state of a system for injecting a deicing agent in a muffler during muffler deicing agent injection according to the present disclosure.

Meanwhile, FIGS. 6-8 show a method for injecting a deicing agent in a muffler for a fuel cell electric vehicle 1 and an operation state of a system 10 for injecting a deicing agent in a muffler through the method. In this case, the control subject is the controller 60 of the system 10 for injecting the deicing agent in the muffler. The control target is the deicing agent injection pump 30 and the deicing agent injector 50 of the system 10 for injecting the deicing agent in the muffler.

Referring to FIG. 6, the method for injecting the deicing agent in the muffler starts from an ambient temperature determination control (S10 to S20) performed by the controller 60. The ambient temperature determination control (S10 to S20) is performed through a deicing agent injection information detection (S10) and an ambient temperature identification (S20).

Referring to FIG. 1, the controller 60 reads the ambient temperature from the temperature sensor 80-1 and the deicing agent storage amount for the deicing agent tank from the flow sensor 80-2 as the deicing agent injection information during the driving of the fuel cell electric vehicle 1. The controller 60 performs the deicing agent injection information detection (S10). Then, the controller 60 performs the ambient temperature identification (S20) with respect to the ambient temperature among the read deicing agent injection information.

As an example, the ambient temperature identification (S20) applies the following ambient temperature identification equation.

Ambient temperature identification equation:Ambient temperature<$\alpha$?

Here, the "ambient temperature" is an ambient temperature detected by the temperature sensor 80-1 during the identification of the deicing agent injection information. In this case, "$\alpha$" is a deicing agent injection ambient temperature and is classified into a first deicing agent injection ambient temperature in the range of 5° C.<$\alpha$<0° C. and a second deicing agent injection ambient temperature in the range of 0° C.<$\alpha$<−10° C. In this case, "<" is an inequality sign indicating a size relationship between the two values.

As a result, if the "ambient temperature <$\alpha$" is not satisfied, the controller 60 returns to the deicing agent injection information detection (S10), whereas if the "ambient temperature <$\alpha$" is satisfied, the controller 60 enters the next step and continuously performs a muffler deicing agent injection logic.

Then, the controller 60 performs deicing agent injection preparation control (S30 to S40), and the deicing agent injection preparation control (S30 to S40) is divided into the deicing agent required amount identification (S30) and the deicing agent storage amount identification (S40).

Referring to FIG. 2, the controller 60 performs the deicing agent required amount identification (S30) using the deicing agent map 70-1 based on the water production amount or the deicing agent map 70-2 based on the hydrogen consumption amount.

As an example, in the case of the first deicing agent injection ambient temperature corresponding to the ambient temperature in the range of 5° C.<$\alpha$<0° C. through the ambient temperature identification (S20), the controller 60 identifies 10 g as the deicing agent required amount by matching the ambient temperature with the range of 5° C.<$\alpha$<0° C. of the deicing agent map 70-1 based on the water production amount or the deicing agent map 70-2 based on the hydrogen consumption amount. In contrast, in the case of the second deicing agent injection ambient temperature corresponding to the ambient temperature in the range of 0° C.<α<−10° C. through the ambient temperature identification (S20), the controller 60 identifies 20 g as the deicing agent required amount by matching the ambient temperature with the range of 0° C.<α<−10° C. of the deicing agent map 70-1 based on the water production amount or the deicing agent map 70-2 based on the hydrogen consumption amount.

Additionally, if the deicing agent required amount corresponds to a case that the water production amount is set to 10 or the hydrogen consumption amount is set to 10, and if the water production amount or the hydrogen consumption amount is increased, the deicing agent required amount is further increased as in the deicing agent map 70-1 based on the water production amount and the deicing agent map 70-2 based on the hydrogen consumption amount.

Referring to FIG. 1, the controller 60 performs the deicing agent storage amount identification (S40) with respect to the deicing agent amount among the read deicing agent injection information.

As an example, the deicing agent storage amount identification (S40) applies the following deicing agent identification equation.

Deicing agent identification equation: Deicing agent amount>β?

Here, the "deicing agent amount" is a deicing agent level of the deicing agent tank 20 (or deicing agent storage amount of the deicing agent tank) detected by the flow sensor 80-2 during the identification of the deicing agent injection information. β" applies 10 g as the first deicing agent required amount at the first deicing agent injection ambient temperature and applies 20 g as the second deicing agent required amount at the second deicing agent injection ambient temperature.

As a result, if the "deicing agent amount >β" is not satisfied, the controller 60 is switched to the deicing agent replenishment necessity notification (S70) and ends the muffler deicing agent injection logic together with driver warning.

Referring to FIG. 1, the controller 60 turns on or flickers the warning light 90 by generating a deicing agent warning signal (c). The deicing agent warning signal guides a driver to recognize a lack of the deicing agent through a driver's seat cluster of the fuel cell electric vehicle 1 and to take proper measures.

In contrast, if the "deicing agent amount >β" is satisfied, the controller 60 enters the next step and continuously proceeds with the muffler deicing agent injection logic.

Continuously, the controller 60 performs the deicing agent injection control (S50 to S60) and the deicing agent injection control (S50 to S60) is performed in the order of the pump driving (S50) and the injector injection (S60).

Referring to FIG. 1, the controller 60 performs the pump driving (S50) by driving the deicing agent injection pump 30 through generation of a pump drive signal (a). In addition, the controller 60 performs the injector injection (S60) by operating the deicing agent injector 50 through generation of an injector drive signal (b).

Referring to FIG. 7, the deicing agent comes out of the deicing agent tank 20 through the driving of the deicing agent injection pump 30 and flows into the deicing agent pipe 40. Then, through the operation of the deicing agent injector 50, the deicing agent is injected from the end of the deicing agent pipe 40 into the exhaust pipe 3 through the deicing agent injector 50.

As a result, the deicing agent is sent to the muffler 4 together with the exhaust gas in the exhaust pipe 3 and is filtered together with the water and the water vapor of the exhaust gas by the etching filter 6 provided in the inner space 4-1 of the muffler 4 to stay in the water collection space formed by the water collection plate 5. In this case, the hydrogen gas of the exhaust gas passes through the etching filter 6, gets out of the muffler 4 after passing through the inner space 4-1, and is discharged from the exhaust pipe 3 to the air.

Accordingly, the deicing agent is mixed with the water in the water collection space of the muffler 4 and is collected in the water collection space until being discharged out of the muffler 4 by the water discharge device 7.

FIG. 8 shows an operation state of the water discharge device 7 in which the water discharge device 7 discharges the water mixture 100 (water+deicing agent) collected in the water collection space of the muffler 4 out of the muffler 4 through the stopper type discharge cup 8-1.

As illustrated, the water mixture 100 generates a mixture pressure P by its own weight and acts as a water pressure on the stopper 8b of the water discharge device 7.

Then, the elastic body 8c is compressed as much as the size of the mixture pressure P to move the stopper 8b downward from the upper end position of the stopper type discharge cup 8-1. As the stopper 8b moves downward, the water mixture 100 flows into the stopper type discharge cup 8-1.

As a result, the water mixture 100 gets out through the discharge holes 8a of the stopper type discharge cup 8-1 until all the water mixture 100 is discharged from the water collection space of the muffler 4.

As described above, the fuel cell electric vehicle 1 according to the present embodiment includes the muffler deicing agent injection system 10 composed of the deicing agent injector 50, injecting the deicing agent, which is pumped by the deicing agent injection pump 30 from the deicing agent tank 20 and is supplied to the deicing agent pipe 40 Additionally, the muffler deicing injection system 10 performs the muffler deicing agent injection logic to inject the deicing agent through the operations of the deicing agent injection pump 30 and the deicing agent injector 50 by the controller 60 under the ambient temperature satisfaction condition and the deicing agent injection satisfaction condition.

Accordingly, the fuel cell electric vehicle 1 can prevent the occurrence of the black ice phenomenon on the road caused by the fuel cell electric vehicle by: injecting the deicing agent into the exhaust pipe 3, through which the hydrogen ($H_2$) and the water vapor generated by the chemical reaction of the hydrogen and the oxygen flow as the exhaust gas; collecting the water mixture 100 of the water and the deicing agent in the muffler 4; and discharging the water mixture out of the muffler 4 Additionally, the fuel cell electric vehicle 1 can optimize the use amount of the liquid deicing agent by making it possible to adjust the injection amount of the deicing agent in the muffler especially in consideration of the ambient temperature and the hydrogen consumption amount as the injection conditions.

While the present disclosure has been described with respect to the specific embodiments, it should be apparent to those having ordinary skill in the art that various changes and modifications may be made without departing from the spirit and scope of the disclosure as defined in the following claims.

What is claimed is:

1. A system for injecting a deicing agent in a muffler, the system comprising:
   a deicing agent tank storing the deicing agent therein;
   a deicing agent injection pump sending out the deicing agent from the deicing agent tank to a deicing agent pipe by pumping the deicing agent; and
   a deicing agent injector provided in the deicing agent pipe and injecting the deicing agent into an exhaust system.

2. The system according to claim 1, wherein the deicing agent injector is directly installed in the exhaust pipe of the exhaust system.

3. The system according to claim 1, wherein the deicing agent injector is directly installed in the muffler of the exhaust system.

4. The system according to claim 1, wherein the deicing agent injection pump and the deicing agent injector are respectively controlled by a controller, and the controller injects the deicing agent under an ambient temperature condition.

5. The system according to claim 4, wherein the ambient temperature condition is classified into a freezing point temperature and a temperature below the freezing point temperature, and wherein an injection amount of the deicing agent is increased at the temperature below the freezing point temperature.

6. The system according to claim 5, wherein the injection amount of the deicing agent is determined by a deicing agent map, and wherein the deicing agent map determines the injection amount of the deicing agent in accordance with an ambient temperature and a water production amount.

7. The system according to claim 6, wherein the water production amount is calculated and determined through the ambient temperature and a hydrogen consumption amount.

8. The system according to claim 4, wherein the controller injects the deicing agent by identifying a deicing agent storage amount of the deicing agent tank through a flow sensor.

9. The system according to claim 8, wherein the controller warns of a lack of the deicing agent storage amount through a warning light.

10. The system according to claim 1, wherein the exhaust system is provided with the muffler, and a water collection structure, formed in the muffler, collects water, caused by the water vapor of the exhaust gas flowing into the muffler and the deicing agent and produces a water mixture.

11. The system according to claim 10, wherein the water collection structure is composed of a water collection plate and an etching filter provided on the water collection plate and filtering the water vapor and the deicing agent.

12. The system according to claim 10, wherein the muffler is provided with a stopper type discharge cup connected to the water collection structure, and wherein the stopper type discharge cup communicates with the water collection structure and discharges the water mixture out of the muffler when a water pressure of the water mixture is higher than an elastic force of an elastic body connected to a stopper.

13. The system according to claim 10, wherein the muffler is provided with a buoyancy type discharge cup connected to the water collection structure, and wherein the buoyancy type discharge cup communicates with the water collection structure by buoyancy of the water mixture and discharges the water mixture out of the muffler.

14. The system according to claim 10, wherein the muffler communicates with a sprayer connected to the water collection structure, and wherein the sprayer discharges the water mixture from the muffler to an outside in various directions.

15. A method for injecting a deicing agent in a muffler, the method comprising:
   an ambient temperature determining step of identifying an ambient temperature condition that requires deicing agent injection by a controller;
   a deicing agent injection preparing step of identifying an injectable deicing agent injection amount as a deicing agent injection condition; and
   a deicing agent injecting step of injecting the deicing agent, coming out from a deicing agent tank through pumping of a deicing agent injection pump and being supplied to a deicing agent pipe, in the deicing agent injection amount through a deicing agent injector, and making the deicing agent flow into the muffler through an inside of an exhaust pipe of an exhaust system in which hydrogen ($H_2$) and water vapor generated by a chemical reaction of the hydrogen and oxygen flow as an exhaust gas.

16. The method according to claim 15, wherein the deicing agent injection condition is a deicing agent storage amount of the deicing agent tank, which is identified by a flow sensor.

17. The method according to claim 16, wherein, if the deicing agent storage amount is lacking as the deicing agent injection amount, such a lack of the deicing agent is warned by a warning light.

* * * * *